(12) United States Patent
Enomoto

(10) Patent No.: US 6,268,965 B1
(45) Date of Patent: Jul. 31, 2001

(54) ZOOM LENS SYSTEM

(75) Inventor: Takashi Enomoto, Chiba (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/432,181

(22) Filed: Nov. 2, 1999

(30) Foreign Application Priority Data

Nov. 4, 1998 (JP) ................................................ 10-313658

(51) Int. Cl.⁷ .................................................. G02B 15/14
(52) U.S. Cl. .......................... 359/692; 359/686; 359/689; 359/782; 359/784; 359/795
(58) Field of Search .................................. 359/692, 686, 359/689, 782, 784, 795

(56) References Cited

U.S. PATENT DOCUMENTS

| | | | |
|---|---|---|---|
| 4,720,179 | 1/1988 | Ito | 359/676 |
| 4,787,718 | * 11/1988 | Cho | 359/692 |
| 4,936,661 | * 6/1990 | Betensky et al. | 359/692 |
| 5,164,859 | 11/1992 | Ito | 359/692 |
| 5,280,390 | * 1/1994 | Ito | 359/692 |
| 5,381,270 | * 1/1995 | Cho | 359/692 |
| 5,424,871 | 6/1995 | Ito et al. | 359/689 |
| 5,610,767 | 3/1997 | Ito | 359/692 |
| 5,633,758 | * 5/1997 | Ueda | 359/692 |
| 5,663,838 | 9/1997 | Hasushita et al. | 359/692 |
| 5,687,028 | 11/1997 | Ito | 359/692 |
| 5,864,435 | * 1/1999 | Toyama | 359/692 |
| 5,900,991 | * 5/1999 | Kang | 359/692 |
| 5,930,052 | 7/1999 | Enomoto et al. | 359/692 |
| 6,072,638 | * 6/2000 | Enomoto | 359/692 |
| 6,128,140 | * 10/2000 | Yoneyama | 359/692 |

FOREIGN PATENT DOCUMENTS

| | | | |
|---|---|---|---|
| 5-11186 | * 1/1993 | (JP) | 359/692 |
| 5-134180 | * 5/1993 | (JP) | 359/692 |
| 5-281472 | * 10/1993 | (JP) | 359/692 |
| 6-109973 | * 4/1994 | (JP) | 359/692 |
| 8-248313 | 9/1996 | (JP) . | |

* cited by examiner

*Primary Examiner*—Evelyn A Lester
(74) *Attorney, Agent, or Firm*—Greenblum & Bernstein P.L.C.

(57) ABSTRACT

A zoom lens system including a positive first lens group and a negative second lens group, in this order from the object, wherein zooming is performed by varying the distance between the first lens group and the second lens group. The positive first lens group includes a negative first sub-lens-group, a positive second sub-lens-group, and a positive third sub-lens-group, in this order from the object, wherein the zoom lens system satisfies the following condition:

$$0.7 < f_T/f_{1\text{-}2} < 1.5 \qquad (1)$$

wherein $f_T$ designates the focal length of the entire zoom lens system at the long focal length extremity; and $f_{1\text{-}2}$ designates the focal length of the positive second sub-lens-group in the first lens group.

9 Claims, 7 Drawing Sheets

FNO=4.8

W=35.6°

W=35.6°

W=35.6°

——— d line
········· g line
– – – C line

——— S
– – M

-0.5  0.5
SPHERICAL
ABERRATION

CHROMATIC
ABERRATION

-0.05  0.05
LATERAL
CHROMATIC
ABERRATION

-0.5  0.5
ASTIGMATISM

-5.0 % 5.0
DISTORTION

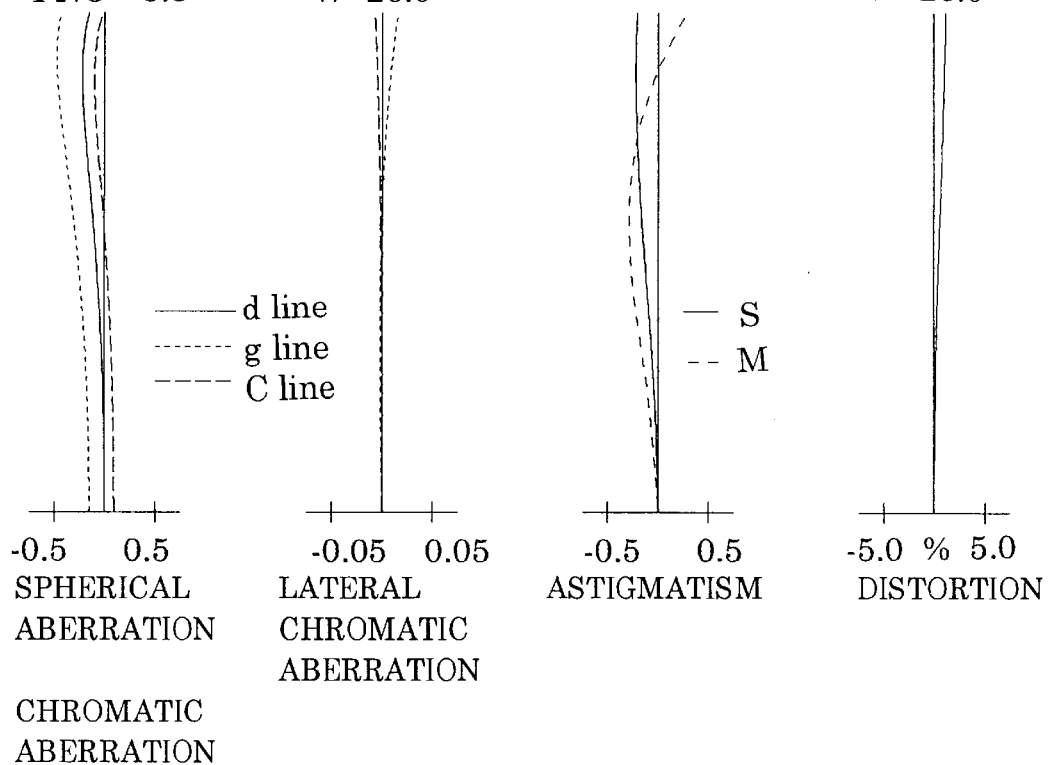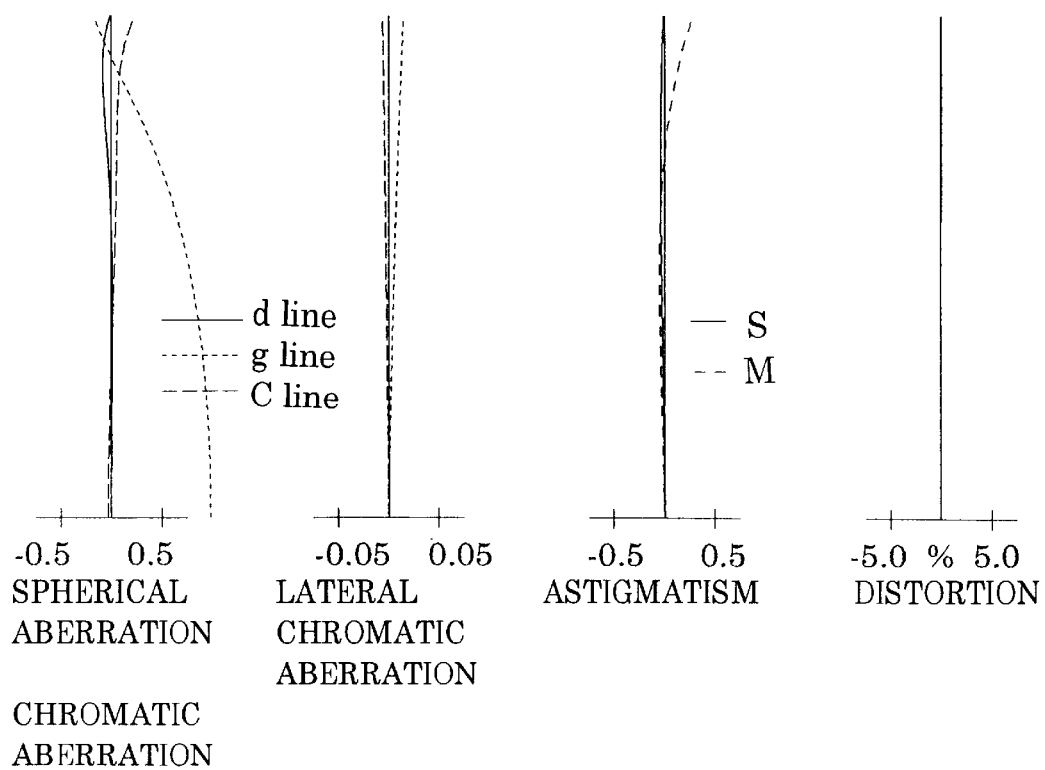

FNO=5.8

——— d line
- - - - g line
- - - - C line

-0.5   0.5
SPHERICAL
ABERRATION

CHROMATIC
ABERRATION

W=36.9°

-0.05   0.05
LATERAL
CHROMATIC
ABERRATION

W=36.9°

——— S
- - - M

-0.5   0.5
ASTIGMATISM

W=36.9°

-5.0 %  5.0
DISTORTION

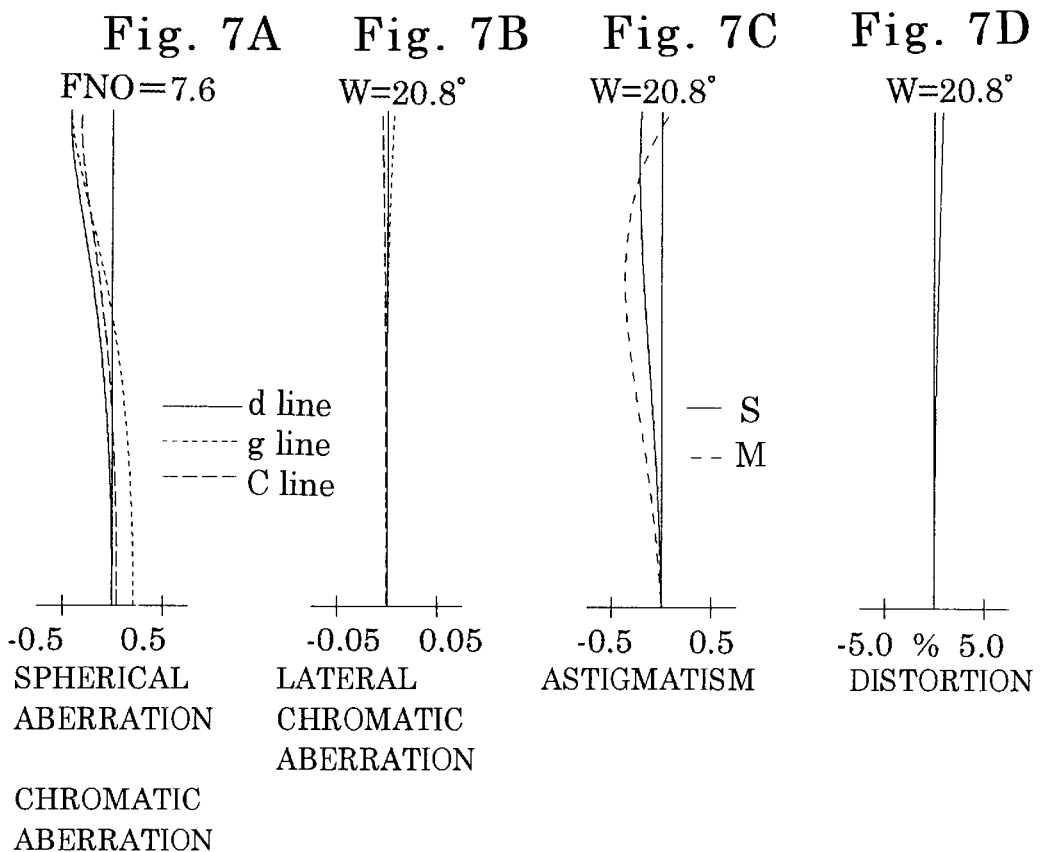
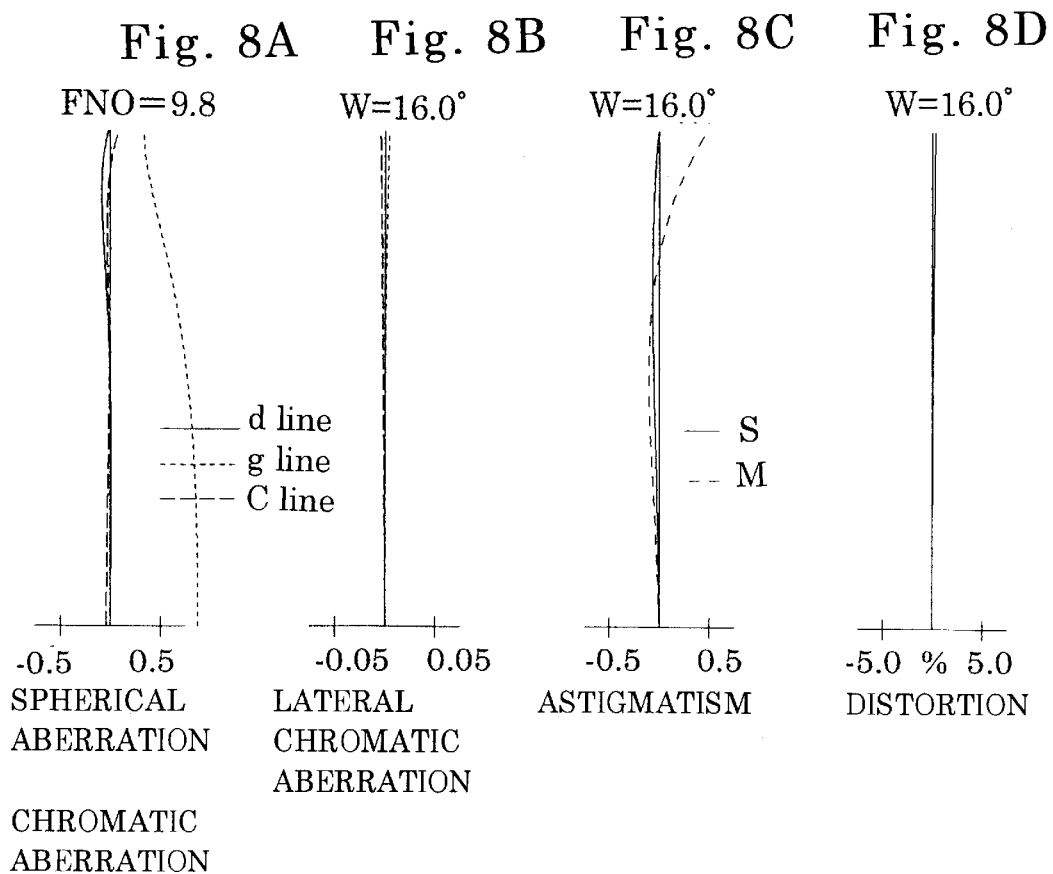

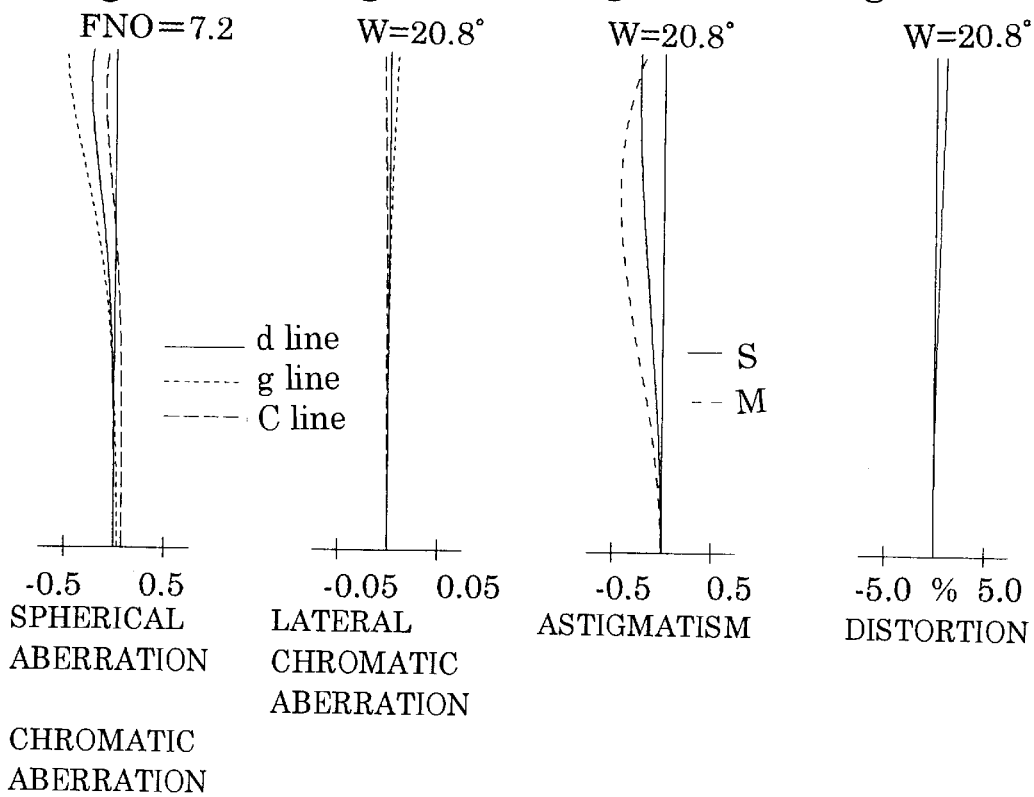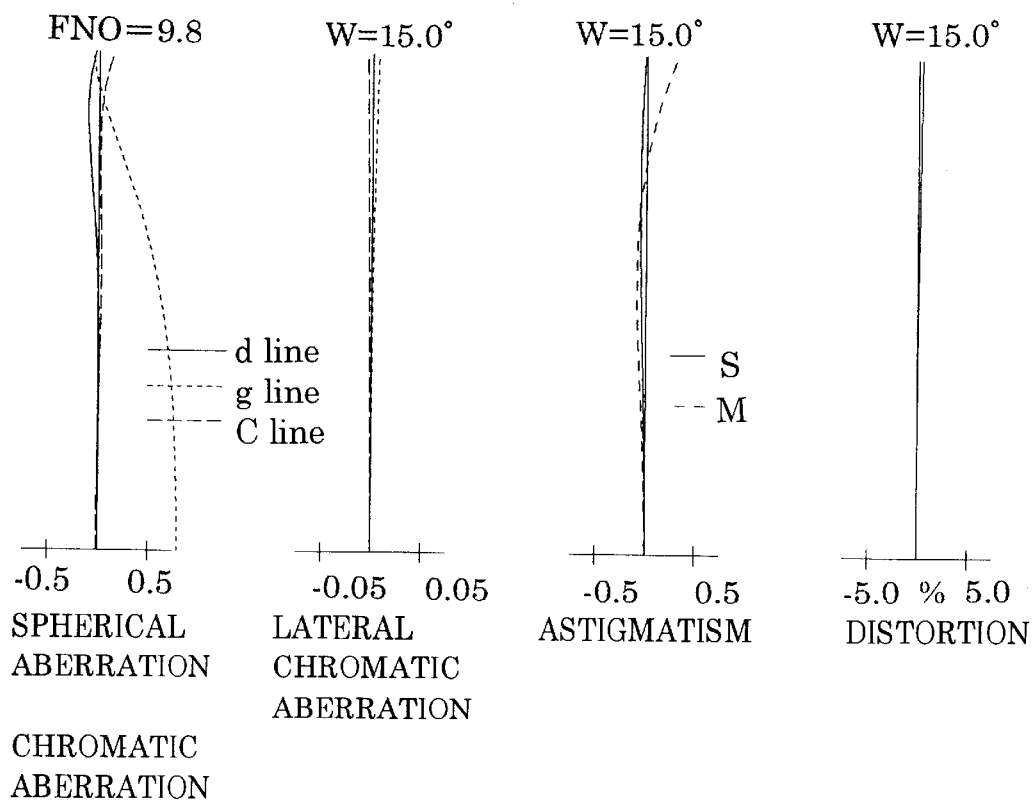

ZOOM LENS SYSTEM

BACKGROUND OF THE INVENTION

1. Field of the Invention

The present invention relates to a zoom lens system for a compact camera, and in particular, relates to a zoom lens system having a wider angle-of-view at the short focal length extremity.

2. Description of the Related Art

Unlike a zoom lens system for a single lens reflex camera which requires space to be provided behind the photographing lens system in order to place a mirror, a zoom lens system of a compact camera does not require a long back focal distance. Accordingly, a zoom lens system for a compact camera generally employs a telephoto type lens system having a positive lens element and a negative lens element, in this order from the object; whereas a zoom lens system for a single lens reflex camera employs a retrofocus type lens system having a negative lens element and a positive lens element, in this order from the object.

When a zoom lens system is a two-lens-group arrangement, the number of lens elements can be reduced, and whereby size and weight reduction of a camera can be achieved, which is also advantageous for reducing production costs of the camera. Accordingly, it is common for a zoom lens system of a compact camera to employ a two-lens-group arrangement. On the other hand, in the case where the half angle-of-view is required to be more than 35° and the zoom ratio is required to be about 2.8, a three-lens-group arrangement is predominantly employed in order to maintain optimum optical performance. However, if a three-lens-group zoom lens system is employed, the diameter of the front-most lens element in the front lens group has to be increased, and the number of lens elements is also increased, both of which adversely influence miniaturization of the camera. Furthermore, due to the complexity of a three-lens-group arrangement, adjustment work thereof is difficult.

SUMMARY OF THE INVENTION

It is an object of the present invention to provide a telephoto type two-lens-group zoom lens system with a smaller number of lens elements, in particular, to provide a zoom lens system which is compact and inexpensive, and has a half angle-of-view of more than 35° at the short focal length extremity, and a zoom ratio of about 2.8.

In order to achieve the above mentioned object, there is provided a zoom lens system including a positive first lens group and a negative second lens group, in this order from the object, wherein zooming is performed by varying the distance between the first lens group and the second lens group. The positive first lens group includes a negative first sub-lens-group, a positive second sub-lens-group, and a positive third sub-lens-group, in this order from the object, wherein the zoom lens system satisfies the following condition:

$$0.7 < f_T / f_{1\text{-}2} < 1.5 \tag{1}$$

wherein $f_T$ designates the focal length of the entire zoom lens system at the long focal length extremity; and $f_{1\text{-}2}$ designates the focal length of the positive second sub-lens-group in the first lens group.

The positive second sub-lens-group in the first lens group preferably includes a cemented sub-lens-group having a positive lens element and a negative lens element. The order of the positive lens element and a negative lens element is not necessarily specified. The cemented sub-lens-group satisfies the following conditions:

$$0.6 < f_W / |f_{(1\text{-}2)C}| < 1.2 \tag{2}$$

$$30 < \nu_p - \nu_n \tag{3}$$

wherein n' designates the refractive index of the image-side lens element of the cemented sub-lens-group;

n designates the refractive index of the object-side lens element of the cemented sub-lens-group;

$r_C$ designates the radius of curvature of the cemented surface of the cemented sub-lens-group;

$\nu_p$ designates the Abbe number of the positive lens element of the cemented sub-lens-group;

$\nu_n$ designates- the Abbe number of the negative lens element of the cemented sub-lens-group; and $f_{(1\text{-}2)C}$ designates $r_C/(n'-n)$.

The zoom lens system according to the present invention preferably satisfies the following conditions:

$$-1.0 < r_1 / f_W < -0.2 \tag{4}$$

$$-1.2 < f_{1G}/f_{1\text{-}1} < -0.5 \tag{5}$$

$$40 < \nu_{1\text{-}1} \tag{6}$$

wherein $r_1$ designates the radius of curvature of the first surface of the negative first sub-lens-group of the first lens group;

$f_W$ designates the focal length of the entire zoom lens system at the short focal length extremity;

$f_{1G}$ designates the focal length of the positive first lens group;

$f_{1\text{-}1}$ designates the focal length of the negative first sub-lens-group in the first lens group; and $\nu_{1\text{-}1}$ designates the average of the Abbe number of the negative first sub-lens-group in the first lens group.

The negative first sub-lens-group can be composed of a negative single lens element.

The positive first lens group preferably includes a lens element having an aspherical surface which satisfies the following condition:

$$-30 < \Delta I_{ASP} < -18 \tag{7}$$

wherein $\Delta I_{ASP}$ designates the amount of change in the spherical aberration coefficient due to the aspherical surface when the focal length at the short focal length extremity is converted to 1.0.

The negative second lens group preferably includes a lens element having an aspherical surface which satisfies the following condition:

$$0 < \Delta V_{ASP} < 0.3 \tag{8}$$

wherein $\Delta V_{ASP}$ designates the amount of change in the distortion coefficient due to the aspherical surface when the focal length at the short focal length extremity is converted to 1.0.

Furthermore, according to the zoom lens system of the present invention, a diaphragm is provided between the positive first lens group and the negative second lens group.

The diaphragm is preferably controlled so that the mechanical full-aperture diameter of the diaphragm at the short focal length extremity is smaller than the mechanical full-aperture diameter at the long focal length extremity.

The present disclosure relates to subject matter contained in Japanese Patent Application No.Hei-10-313658 (filed on Nov. 4, 1998) which is expressly incorporated herein by reference in its entirety.

BRIEF DESCRIPTION OF THE DRAWINGS

The invention will be discussed below in detail with reference to the accompanying drawings, in which:

FIGS. 3A, 3B, 3C and 3D show aberration diagrams of the lens arrangement of FIG. 1 at an intermediate focal length;

FIGS. 4A, 4B, 4C and 4D show aberration diagrams of the lens arrangement of FIG. 1 at the long focal length extremity;

FIGS. 7A, 7B, 7C and 7D show aberration diagrams of the lens arrangement of FIG. 5 at an intermediate focal length;

FIGS. 8A, 8B, 8C and 8D show aberration diagrams of the lens arrangement of FIG. 5 at the long focal length extremity;

FIGS. 11A, 11B, 11C and 11D show aberration diagrams of the lens arrangement of FIG. 9 at an intermediate focal length;

FIGS. 12A, 12B, 12C and 12D show aberration diagrams of the lens arrangement of FIG. 9 at the long focal length extremity.

DESCRIPTION OF THE PREFERRED EMBODIMENTS

Figure 13:
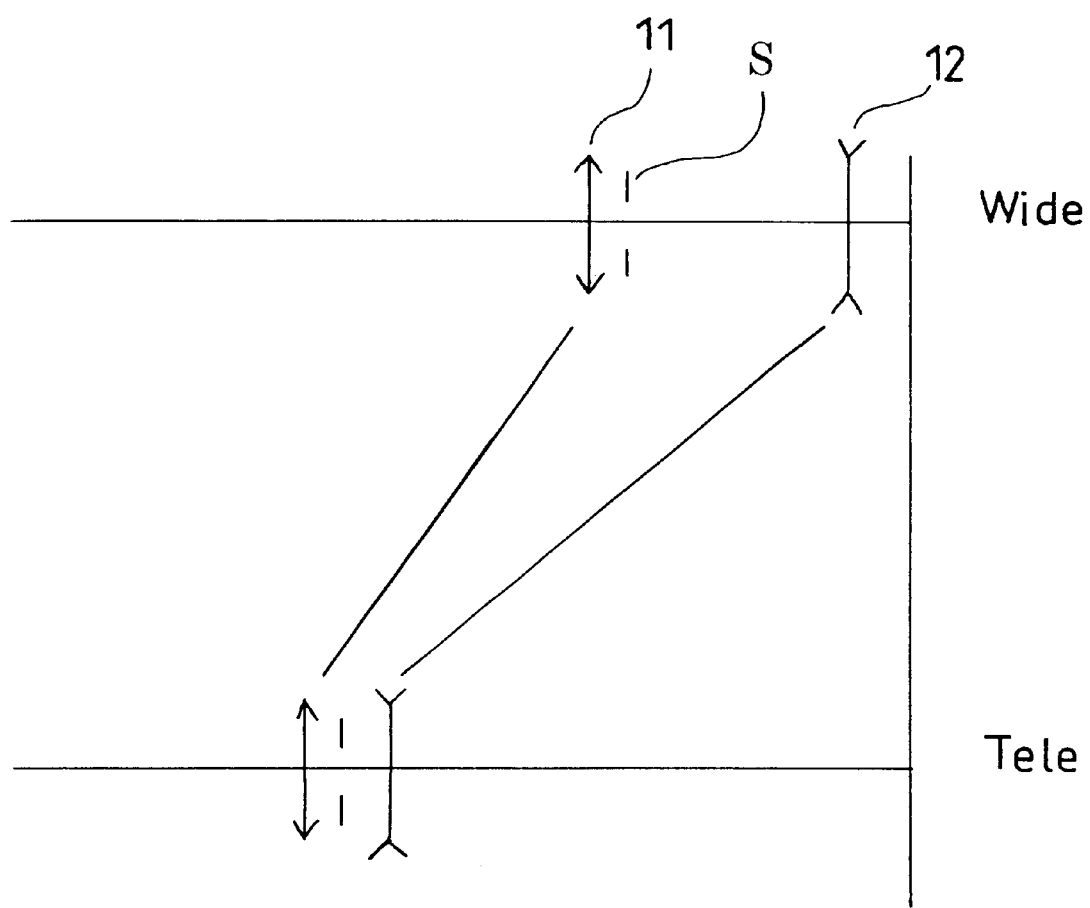
FIG. 13 is a diagram showing the lens-group moving paths of a zoom lens system according to the present invention.

The zoom lens system of the present invention includes a positive first lens group 11 and the negative second lens group 12, in this order from the object, and thereby zooming is performed by varying the distance between the first and second lens groups. As shown in FIG. 13, upon zooming from the short focal length extremity towards the long focal length extremity, the space between the first lens group 11 and the second lens group 12 is reduced while both lens groups are moved towards the object. A diaphragm S is provided between the first lens group 11 and the second lens group 12 and moves integrally with the first lens group 11. Focusing can be performed by the first lens group alone, or by the first and second lens groups. The positive first lens group 11 includes a negative first sub-lens-group 1-1, a positive second sub-lens-group 1-2, and a positive third sub-lens-group 1-3.

Condition (1) specifies the positive second sub-lens-group 1-2 of the positive first lens group 11. By satisfying condition (1), the back focal distance can be shortened, and the lens system can be miniaturized.

If $f_T/f_{1-2}$ exceeds the upper limit of condition (1), aberrations in the positive second sub-lens-group 1-2 increase, and aberrations occurred at a focal length position within the range from the short focal length extremity to the long focal length extremity cannot be adequately corrected. If $f_T/f_{1-2}$ exceeds the lower limit of condition (1), the back focal distance is made longer, and he compactness of the lens system cannot be attained.

Condition (2) specifies the power of a cemented surface, when the positive second sub-lens-group 1-2 is formed as a cemented sub-lens-group having a positive lens element and a negative lens element. By satisfying condition (2), spherical aberration and coma can be corrected. Furthermore, by appropriately determining the radius of curvature of the cemented surface, even if a F-number is made smaller, i.e., even if the diameter of the lens elements constituting the cemented sub-lens-group is made larger, production of the cemented sub-lens-group is possible. If $f_W/|f_{(1-2)C}|$ exceeds the upper limit of condition (2), divergence of the cemented sub-lens-group becomes too great, so that spherical aberration is over-corrected, and aberration of higher order occurs. Furthermore, the radius of curvature becomes small, which makes production of the cemented sub-lens-group difficult. Accordingly, the cemented sub-lens-group with a larger diameter cannot be obtained, and thereby the F-number cannot be made smaller, i.e, a bright lens element cannot be obtained. If $f_W/|f_{(1-2)C}|$ exceeds the lower limit of condition (2), the effect of divergence is minimal, and the effect of correcting spherical aberration cannot be adequately attained.

Condition (3) specifies the Abbe numbers with respect o the cemented sub-lens-group constituted by the positive lens element and the negative lens element. By satisfying condition (3), chromatic aberration from the short focal length extremity towards the long focal length extremity can be adequately corrected. If $v_P-v_n$ exceeds the lower limit of condition (3), it becomes difficult to correct chromatic aberration adequately from the short focal length extremity towards the long focal length extremity.

In a two-lens-group zoom lens system, the amount of peripheral illumination on the image plane is reduced, if the focal length at the short focal length extremity is made shorter.

Condition (4) specifies the radius of curvature of the first surface of the first lens element which is the most object-side lens element in the positive first lens group 11. Under the condition that condition (4) is satisfied, by forming the first surface of the first lens element as a divergent surface, the diameter of the first lens element can be made smaller while the amount of peripheral illumination is maintained, and further, the focal length at the short focal length extremity can be made shorter.

If $r_1/f_W$ exceeds the upper limit of condition (4), the radius of curvature of the first surface of the first lens element becomes smaller. Consequently, aberrations increase, and the correcting thereof cannot be sufficiently performed. If $r_1/f_W$ exceeds the lower limit of condition (4), the angle-of-view at the short focal length extremity cannot be made larger.

Furthermore, in order to make the focal length at the short focal length extremity shorter, it is necessary to appropriately determine the power of the negative first sub-lens-group 1-1 of the positive first lens group 11.

Condition (5) specifies the focal length of the negative first sub-lens-group 1-1. By satisfying condition (5), aberrations are adequately corrected, and the angle-of-view at the short focal length extremity can be made larger.

If $f_{1G}/f_{1-1}$ exceeds the upper limit of condition (5), the angle-of-view at the short focal length extremity cannot be made larger. If $f_{1G}/f_{1-1}$ exceeds the lower limit of condition (5), the power of the negative first sub-lens-group increases, so that aberrations increase, and the correcting thereof cannot be adequately performed.

In addition to the above, in order to correct chromatic aberration from the short focal length extremity towards the long focal length extremity, it is necessary to appropriately determine an average Abbe number for the negative first sub-lens-group 1-1 of the positive first lens group 11.

Condition (6) specifies the average Abbe number of the negative first sub-lens-group 1-1 of the positive first lens group 11. By satisfying condition (6), the occurrence of chromatic aberration in the positive first lens group is suppressed, and chromatic aberration from the short focal length extremity towards the long focal length extremity can be adequately corrected.

If $\nu_{1-1}$ exceeds the lower limit of condition (6), chromatic aberration cannot be sufficiently corrected at a focal length position within the range from the short focal length extremity to the long focal length extremity Furthermore, in the positive first lens group 11, it is preferable to provide at least one lens element having an aspherical surface.

Condition (7) specifies the amount of asphericity when a lens element having an aspherical surface is provided in the positive first lens group 11. By satisfying condition (7), the number of lens elements in the positive first lens group 11 can be reduced, and spherical aberration can be corrected at a focal length position within the range from the short focal length extremity to the long focal length extremity.

If $\Delta I_{ASP}$ exceeds the upper limit of condition (7), the effect of correcting spherical aberration through the aspherical surface is minimal, and the correcting of aberrations cannot be sufficiently performed. If $\Delta I_{ASP}$ exceeds the lower limit of condition (7), the amount of asphericity increases, which causes difficulties in producing the aspherical lens element. In order to correct spherical aberration, it is most effective to form the aspherical surface on a lens surface closest to the diaphragm.

In the negative second lens group 12, it is preferable to provide at least one lens element having an aspherical lens surface.

Condition (8) specifies the amount of asphericity when a lens element having an aspherical surface is provided in the negative second lens group 12. By satisfying condition (8), the number of lens elements in the negative second lens group 12 can be reduced, and in particular, distortion at the short focal length extremity can be corrected.

If $\Delta V_{ASP}$ exceeds the upper limit of condition (8), the amount of asphericity increases, which causes difficulties in producing the aspherical lens element. If $\Delta V_{ASP}$ exceeds the lower limit of condition (8), the effect of correcting distortion through the aspherical surface is minimal, and the correcting of aberrations cannot be sufficiently performed. In a case where distortion is effectively corrected while difficulties in producing the aspherical lens element is considered, it is most effective to form the aspherical surface on the object-side surface of the object-side lens element, in the negative second lens group, whose diameter is not relatively large.

In the zoom lens system according to the present invention, the diaphragm S which moves integrally with the positive first lens group 11 is provided between the positive first lens group 11 and the negative second lens group 12. If the diameter of the mechanical full-aperture of the diaphragm S is determined with consideration of the F-number at the long focal length extremity, in a zoom lens system like that of the present invention in which the angle-of-view at the short focal length extremity is made larger and a large zoom ratio is attained, the F-number at the short focal length extremity tends to be smaller. As a result, difficulties occur in the correcting of aberrations, and in order to maintain peripheral illumination and adequate thickness of the edge of the lens elements, the diameter of the first lens group 11 has to be increased.

In order to solve the above problems, the diaphragm S is preferably controlled so that the mechanical full-aperture diameter of the diaphragm S at the short focal length extremity is smaller than the mechanical full-aperture diameter at the long focal length extremity. Since diaphragm mechanisms which have a variable mechanical full-aperture are well known in the art, by utilizing such mechanisms, a control mechanism for varying the diameter of the mechanical full-aperture can be attained.

The relation between the aspherical coefficients and the aberration coefficients will be herein discussed. The shape of the aspherical surface can be generally defined as follows:

$$x = cy^2/\{1+[1-(1+K)c^2y^2]^{1/2}\} + A4y^4 + A6y^6 + A8y^8 + A10y^{10} + \ldots\ ;$$

wherein:

x designates a distance from a tangential plane of an aspherical vertex;

y designates a distance from the optical axis;

c designates a curvature of the aspherical vertex (1/R),

K designates a conic constant;

A4 designates a fourth-order aspherical coefficient;

A6 designates a sixth-order aspherical coefficient;

A8 designates a eighth-order aspherical coefficient; and

A10 designates a tenth-order aspherical coefficient.

In this equation, to obtain the aberration coefficients, the following substitution is made to replace K with "0" (Bi=Ai when K=0).

$$B4 = A4 + Kc^3/8$$

$$B6 = A6 + (K^2 + 2K)c^5/16$$

$$B8 = A8 + 5(K^3 + 3K^2 + 3K)c^7/128$$

$$B10 = A10 + 7(K^4 + 4K^3 + 6K^2 + 4K)c^9/256$$

Hence, the following equation is obtained:

$$x = cy^2/\{1+[1-c^2y^2]^{1/2}\} + B4y^4 + B6y^6 + B8y^8 + B10y^{10} +$$

When the focal length f is normalized to 1.0, the resultant value is transformed as shown below. Namely, the following equations are substituted into the above equation:

$$X = x/f,\ Y = y/f,\ C = fc$$

$$\alpha 4 = f^3 B4,\ \alpha 6 = f^5 B6,\ \alpha 8 = f^7 B8,\ \alpha 10 = f^9 B10$$

Accordingly, the following equation is obtained.

$$X=CY^2/\{1+[1-C^2Y^2]^{1/2}\}+\alpha 4Y^4+\alpha 6Y^6+\alpha 8Y^8+\alpha 10Y^{10}+$$

The second and subsequent terms define the amount of asphericity of the aspherical surface.

Then the third order aberration contributions due to the fourth order aspherical coefficient α4 are obtained as follows:

$$\Delta I=h^4\Phi$$

$$\Delta II=h^3k\Phi$$

$$\Delta III=h^2k^2\Phi$$

$$\Delta IV=h^2k^2\Phi$$

$$\Delta V=hk^3\Phi$$

wherein
- I designates the spherical aberration coefficient;
- II designates the coma coefficient;
- III designates the astigmatism coefficient;
- IV designates the sagittal field of curvature coefficient;
- V designates the distortion coefficient;
- h1 designates the height at which a paraxial on-axis ray strikes the first surface of an optical system including an aspherical surface;
- h designates the height at which the paraxial on-axis ray strikes the aspherical surface of the optical system when h1 is 1 (one);
- k1 designates the height at which a paraxial off-axis ray, which comes from an off-axis object point and passes through the center of the entrance pupil, strikes the first surface of an optical system including an aspherical surface;
- k designates the height at which the paraxial off-axis ray strikes the aspherical surface of the optical system when k1 is −1 (minus one); and
- $\Phi=8(N'-N)\alpha 4$ wherein
- N designates the refractive index of a medium on the side of the object with respect to the aspherical surface;
- N' designates the refractive index of a medium on the side of the image with respect to the aspherical surface.

Specific numerical examples will herein be discussed. In the diagrams of chromatic aberration (axial chromatic aberration) represented by spherical aberration, the solid lines and the two types of dotted lines respectively indicate spherical aberration with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables, F$_{NO}$ designates the F-number, f designates the focal length of the entire lens system, W designates the half angle-of-view, f$_B$ designates the back focal distance, R designates the radius of curvature, D designates the lens thickness or space between lens surfaces, N$_d$ designates the refractive index with respect to the d-line, and ν designates the Abbe number.

[Embodiment 1]

Figure 1:
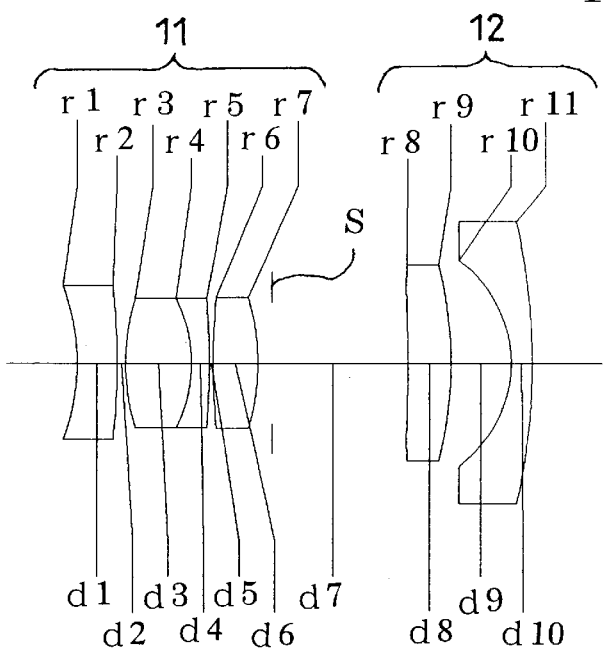
FIG. 1 is a lens arrangement of a first embodiment of a zoom lens system according to the present invention.
Figure 2A:
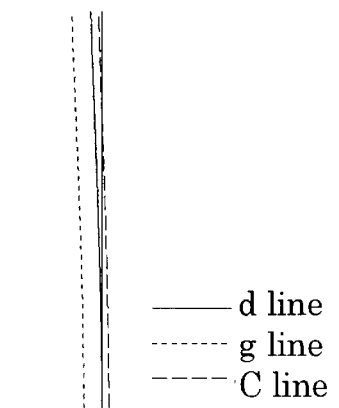
FIGS. 2A, 2B, 2C and 2D show aberration diagrams of the lens arrangement of FIG. 1 at the short focal length extremity.
Figure 2B:
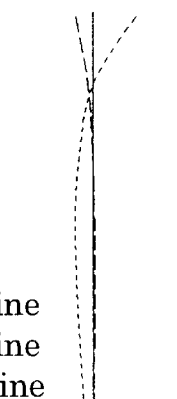
Figure 2C:
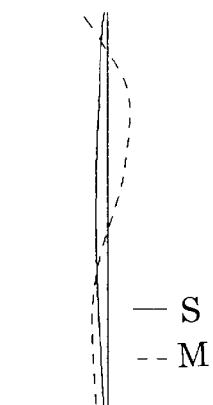
Figure 2D:
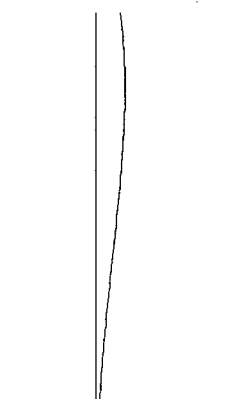

FIG. 1 is a lens arrangement of a first embodiment of a zoom lens system according to the present invention. FIGS. 2A through 2D, FIGS. 3A through 3D and FIGS. 4A through 4D show aberration diagrams of the lens arrangement of FIG. 1 respectively at the short focal length extremity, an intermediate focal length and the long focal length extremity. Table 1 shows the numerical data thereof. Surface nos. 1 through 7 designate the positive first lens group 11, and surface nos. 8 through 11 designate the negative second lens group 12. The first lens group 11 includes a negative single lens element (a negative first sub-lens-group 1-1)(surface nos. 1 and 2), a cemented sub-lens-group (a positive second sub-lens-group 1-2) constituted by a positive second lens element (surface nos. 3 and 4) and a negative third lens element (surface nos. 4 and 5), and a positive fourth lens element (a positive third sub-lens-group 1-3) (surface nos. 6 and 7). The negative second lens group 12 includes a positive fifth lens element (surface nos. 8 and 9) and a negative sixth lens element (surface nos. 10 and 11). The full aperture diameter of the diaphragm S continuously varies from the short focal length extremity towards the long focal length extremity. The full aperture diameter is ∅ 5.30 at the short focal length extremity and is ∅ 6.94 at the long focal length extremity.

TABLE 1

$F_{NO} = 1:4.8–5.3–9.8$
 $f = 23.50–35.00–67.50$ (Zoom Ratio:2.87)
 $W = 35.6–26.0–14.3$
 $f_B = 6.24–16.30–44.72$

| Surface No. | R | D | Nd | ν |
|---|---|---|---|---|
| 1 | −12.664 | 2.26 | 1.82210 | 45.6 |
| 2 | −38.481 | 0.47 | — | — |
| 3 | 13.283 | 3.71 | 1.48749 | 70.2 |
| 4 | −8.282 | 1.00 | 1.84177 | 36.1 |
| 5 | −43.202 | 0.20 | — | — |
| 6 | 38.821 | 2.54 | 1.73077 | 40.5 |
| 7* | −12.273 | 0.80 | — | — |
| Diaphragm | ∞ | 7.66~4.56~1.51 | — | — |
| 8* | −53.302 | 2.41 | 1.58547 | 29.9 |
| 9 | −23.070 | 3.42 | — | — |
| 10 | −7.334 | 1.20 | 1.83500 | 44.8 |
| 11 | −36.789 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 7 | 0.00 | $0.1834 \times 10^{-3}$ | $-0.8021 \times 10^{-6}$ | $0.2250 \times 10^{-7}$ |
| 8 | 0.00 | $0.1978 \times 10^{-3}$ | $-0.6365 \times 10^{-6}$ | $0.7020 \times 10^{-7}$ |

[Embodiment 2]

Figure 5:
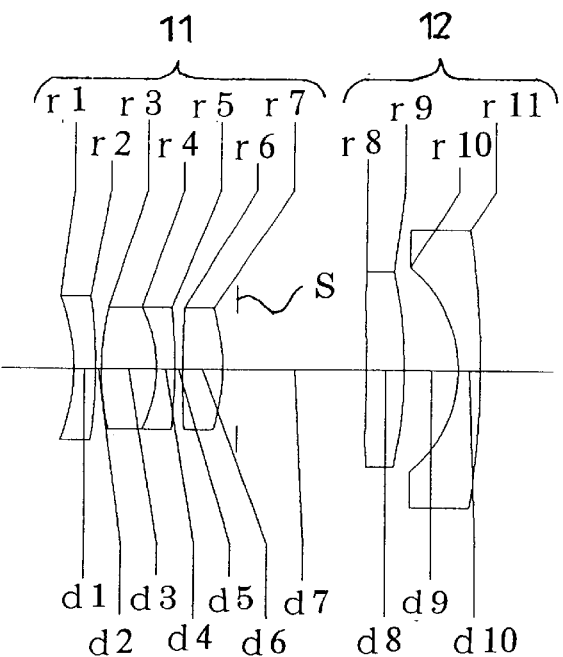
FIG. 5 is a lens arrangement of a second embodiment of a zoom lens system according to the present invention.
Figure 6A:
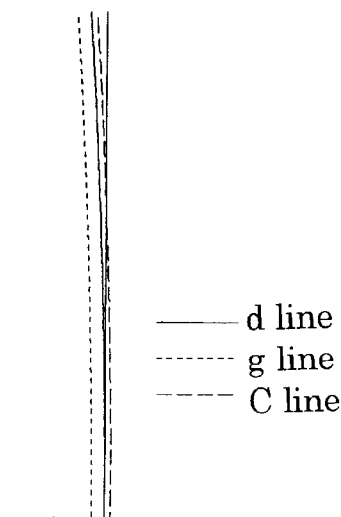
FIGS. 6A, 6B, 6C and 6D show aberration diagrams of the lens arrangement of FIG. 5 at the short focal length extremity.
Figure 6B:
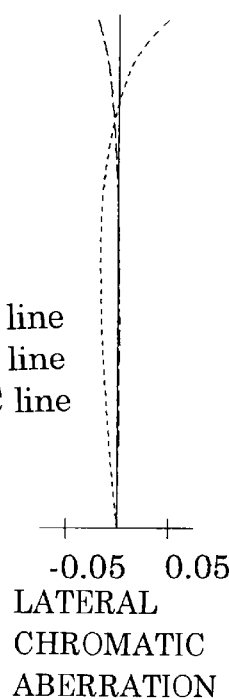
Figure 6C:
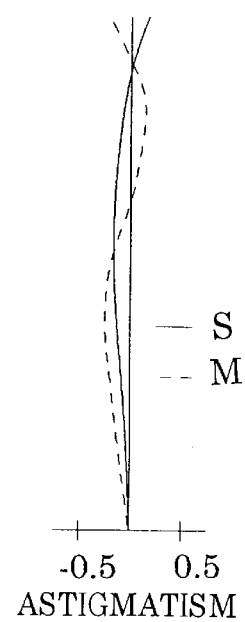
Figure 6D:
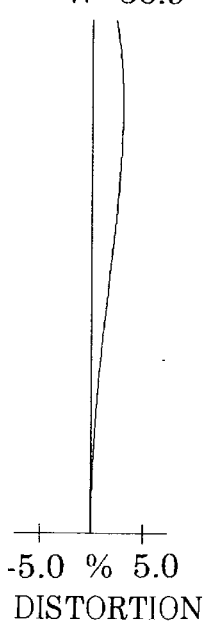

FIG. 5 is a lens arrangement of a second embodiment of a zoom lens system according to the present invention. FIGS. 6A through 6D, FIGS. 7A through 7D and FIGS. 8A through 8D show aberration diagrams of the lens arrangement of FIG. 5 respectively at the short focal length extremity, an intermediate focal length and the long focal length extremity. Table 2 shows the numerical data thereof. The basic lens arrangement of the second embodiment is the same as that of the first embodiment. The full aperture diameter of the diaphragm S is ∅ 4.02 at the short focal length extremity and is ∅ 6.04 at the long focal length extremity.

TABLE 2

$F_{NO}$ = 1:5.8–7.6–9.8
f = 22.50–45.00–60.00 (Zoom Ratio:2.67)
W = 36.9–20.8–16.0
$f_B$ = 6.22–26.14–39.42

| Surface No. | R | D | Nd | ν |
|---|---|---|---|---|
| 1 | −10.458 | 1.20 | 1.71539 | 51.5 |
| 2 | −27.172 | 0.30 | — | — |
| 3 | 13.975 | 3.03 | 1.48749 | 70.2 |
| 4 | −7.205 | 1.00 | 1.84500 | 33.7 |
| 5 | −28.187 | 0.43 | — | — |
| 6 | 67.470 | 2.18 | 1.73077 | 40.5 |
| 7* | −10.546 | 0.80 | — | — |
| Diaphragm | ∞ | 7.10–2.58–1.45 | — | — |
| 8* | −73.535 | 2.09 | 1.58547 | 29.9 |
| 9 | −23.955 | 2.96 | — | — |
| 10 | −7.143 | 1.20 | 1.80000 | 46.8 |
| 11 | −50.008 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 7 | 0.00 | 0.1950 × 10⁻³ | −0.8276 × 10⁻⁶ | 0.3658 × 10⁻⁷ |
| 8 | 0.00 | 0.2175 × 10⁻³ | −0.2786 × 10⁻⁶ | 0.7491 × 10⁻⁷ |

[Embodiment 3]

Figure 9:
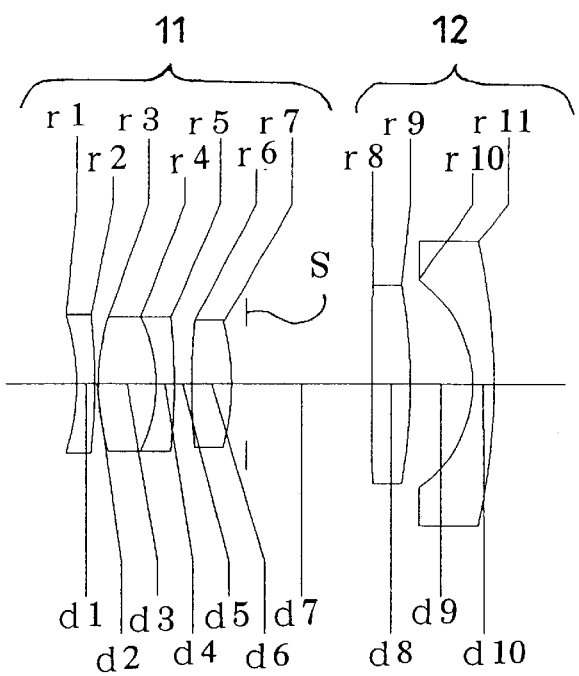
FIG. 9 is a lens arrangement of a third embodiment of a zoom lens system according to the present invention.
Figures 10A, 10B, 10C, 10D:
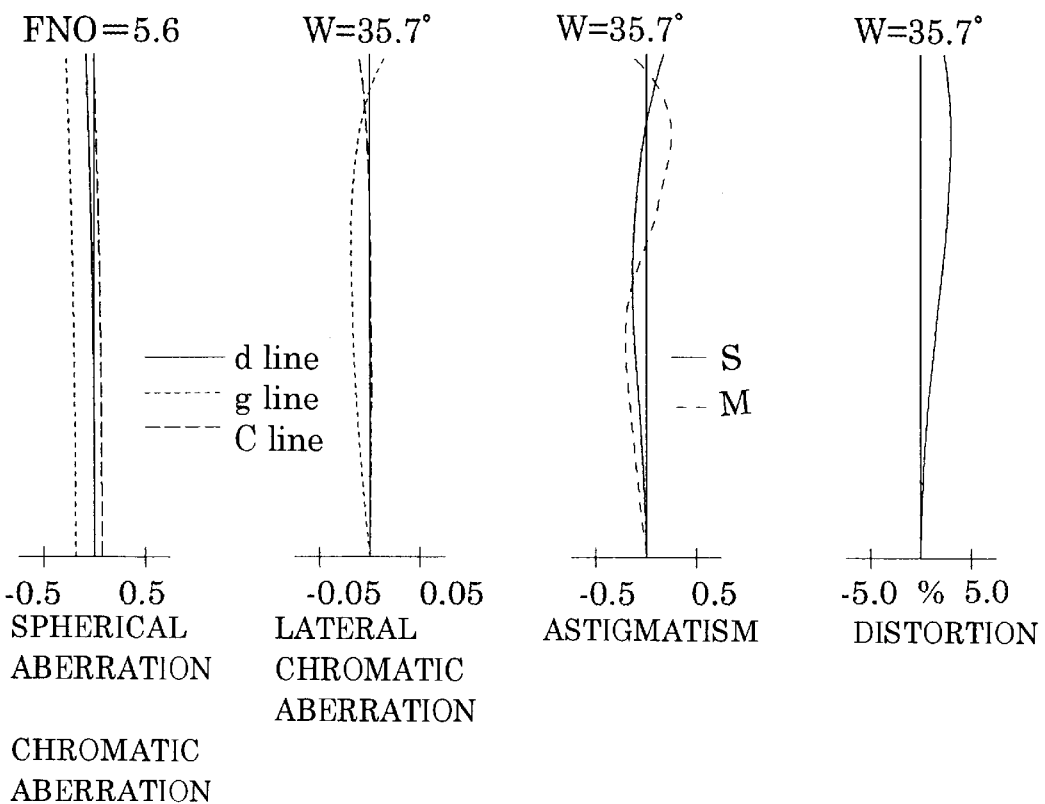
FIGS. 10A, 10B, 10C and 10D show aberration diagrams of the lens arrangement of FIG. 9 at the short focal length extremity.

FIG. 9 is a lens arrangement of a third embodiment of a zoom lens system according to the present invention. FIGS. 10A through 10D, FIGS. 11A through 11D and FIGS. 12A through 12D show aberration diagrams of the lens arrangement of FIG. 9 respectively at the short focal length extremity, an intermediate focal length and the long focal length extremity. Table 3 shows the numerical data thereof. The basic lens arrangement of the second embodiment is the same as that of the first embodiment. The full aperture diameter of the diaphragm S is ⌀ 4.30 at the short focal length extremity and is ⌀ 6.34 at the long focal length extremity.

TABLE 3

$F_{NO}$ = 1:5.6–7.2–9.8
f = 23.50–45.00–64.00 (Zoom Ratio:2.72)
W = 35.7–20.8–15.0
$f_B$ = 6.19–24.26–40.24

| Surface No. | R | D | Nd | ν |
|---|---|---|---|---|
| 1 | −11.836 | 1.00 | 1.81110 | 46.2 |
| 2 | −33.392 | 0.20 | — | — |
| 3 | 12.881 | 3.23 | 1.48749 | 70.2 |
| 4 | −8.344 | 1.00 | 1.82902 | 34.9 |
| 5 | −40.082 | 0.99 | — | — |
| 6 | 34.752 | 2.24 | 1.73077 | 40.5 |
| 7* | −12.414 | 0.80 | — | — |
| Diaphragm | ∞ | 6.97–2.77–1.41 | — | — |
| 8* | −98.529 | 2.13 | 1.58547 | 29.9 |
| 9 | −31.760 | 3.46 | — | — |
| 10 | −7.143 | 1.20 | 1.83500 | 44.8 |
| 11 | −35.542 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 7 | 0.00 | 0.2062 × 10⁻³ | −0.1183 × 10⁻⁵ | −0.3374 × 10⁻⁷ |
| 8 | 0.00 | 0.2282 × 10⁻³ | −0.6828 × 10⁻⁶ | 0.7020 × 10⁻⁷ |

Table 4 shows numerical values of each condition of each embodiment.

TABLE 4

| | Embodiment 1 | Embodiment 2 | Embodiment 3 |
|---|---|---|---|
| Condition (1) | 1.05 | 1.01 | 1.23 |
| Condition (2) | 1.00 | 1.12 | 0.96 |
| Condition (3) | 34.1 | 36.5 | 35.3 |
| Condition (4) | −0.54 | −0.47 | −0.50 |
| Condition (5) | −0.67 | −0.62 | −0.68 |
| Condition (6) | 45.1 | 51.5 | 46.2 |
| Condition (7) | −23.8 | −20.7 | −23.4 |
| Condition (8) | 0.19 | 0.18 | 0.19 |

As can be understood from Table 4, each embodiment satisfies each condition, and as can be understood from the aberration diagrams, aberrations have been adequately corrected.

According to the present invention, a telephoto type two-lens-group zoom lens system which is compact and inexpensive, includes a smaller number of lens elements, and has a half angle-of-view of more than 35° at the short focal extremity and a zoom ratio of about 2.8 can be obtained.

What is claimed is:

1. A zoom lens system comprising a positive first lens group and a negative second lens group, in this order from an object;

wherein zooming is performed by varying the distance between said first lens group and said second lens group;

wherein said positive first lens group comprises a negative first sub-lens-group, a positive second sub-lens-group, and a positive third sub-lens-group, in this order from said object; and wherein said zoom lens system satisfies the following condition:

$0.7 < f_T/f_{1-2} < 1.5$ wherein $f_T$ designates the focal length of the entire zoom lens system at the long focal length extremity; and $f_{1-2}$ designates the focal length of said positive second sub-lens-group in said first lens group.

2. The zoom lens system according to claim 1, wherein said positive second sub-lens-group of said first lens group comprises a cemented sub-lens-group having a positive lens element and a negative lens element; and wherein said cemented sub-lens-group satisfies the following conditions:

$0.6 < f_W/|f_{(1-2)c}| < 1.2$ $30 < \nu_p - \nu_n$ wherein n' designates the refractive index of the image-side lens element of said cemented sub-lens-group;

n designates the refractive index of the object-side lens element of said cemented sub-lens-group;

r$_c$ designates the radius of curvature of the cemented surface of said cemented sub-lens-group;

ν$_p$ designates the Abbe number of said positive lens element of said cemented sub-lens-group;

ν$_n$ designates the Abbe number of said negative lens element of said cemented sub-lens-group; and f$_{(1-2)c}$ designates r$_c$/(n'−n).

3. The zoom lens system according to claim 1, wherein said zoom lens system satisfies the following conditions:

$$-1.0 < r_1/f_w < -0.2$$

$$-1.2 < f_{1G}/f_{1-1} < -0.5$$

$$40 < \nu_{1-1}$$

wherein r$_1$ designates the radius of curvature of the most object-side lens surface of said first lens group;

f$_w$ designates the focal length of the entire zoom lens system at the short focal length extremity;

f$_{1G}$ designates the focal length of said positive first lens group;

f$_{1-1}$ designates the focal length of said negative first sub-lens-group of said first lens group; and ν$_{1-1}$ designates the average of the Abbe number of said negative first sub-lens-group of said first lens group.

4. The zoom lens system according to claim 1, wherein said positive first lens group comprises a lens element having an aspherical surface which satisfies the following condition:

$$-30 < \Delta I_{ASP} < -18$$

wherein ΔI$_{ASP}$ designates the amount of change in the spherical aberration coefficient due to the aspherical surface when the focal length at the short focal length extremity is converted to 1.0.

5. The zoom lens system according to claim 1, wherein said negative second lens group comprises a lens element having an aspherical surface which satisfies the following condition:

$$0 < \Delta V_{ASP} < 0.3$$

wherein

ΔV$_{ASP}$ designates the amount of change in the distortion coefficient due to the aspherical surface when the focal length at the short focal length extremity is converted to 1.0.

6. The zoom lens system according to claim 1, wherein a diaphragm is provided between said positive first lens group and said negative second lens group, wherein said diaphragm is controlled so that the mechanical full-aperture diameter of said diaphragm at the short focal length extremity is smaller than the mechanical full-aperture diameter at the long focal length extremity.

7. The zoom lens system according to claim 1, wherein said negative first sub-lens-group consists of a negative single lens element.

8. The zoom lens system according to claim 1, wherein said positive third sub-lens-group consists of a positive single lens element.

9. The zoom lens system according to claim 1, wherein, in said positive first lens group, said negative first sub-lens group is provided on the side closest to the object, and said positive third sub-lens-group is provided at the side closest to the negative second lens group.

\* \* \* \* \*